Aug. 22, 1967  R. B. BILANE  3,337,211
APPARATUS FOR CONTINUOUSLY FOLDING AND CUTTING OFF WEB MATERIAL
Filed July 23, 1965  6 Sheets-Sheet 1
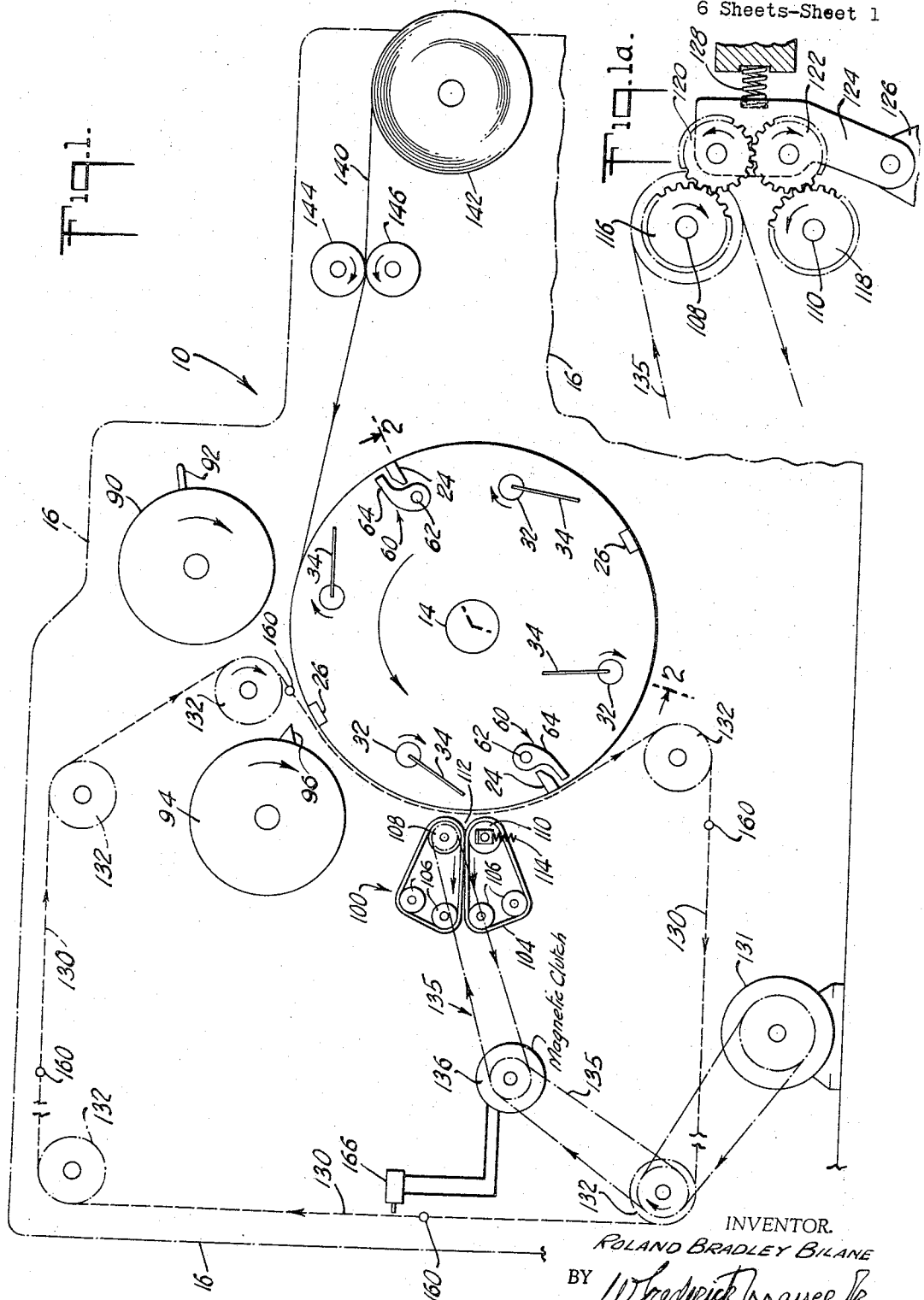
INVENTOR.
ROLAND BRADLEY BILANE
BY
ATTORNEY

INVENTOR.
ROLAND BRADLEY BILANE
ATTORNEY

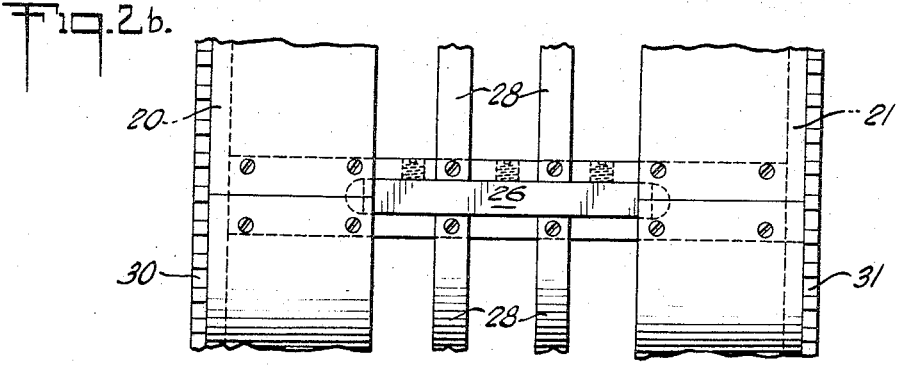
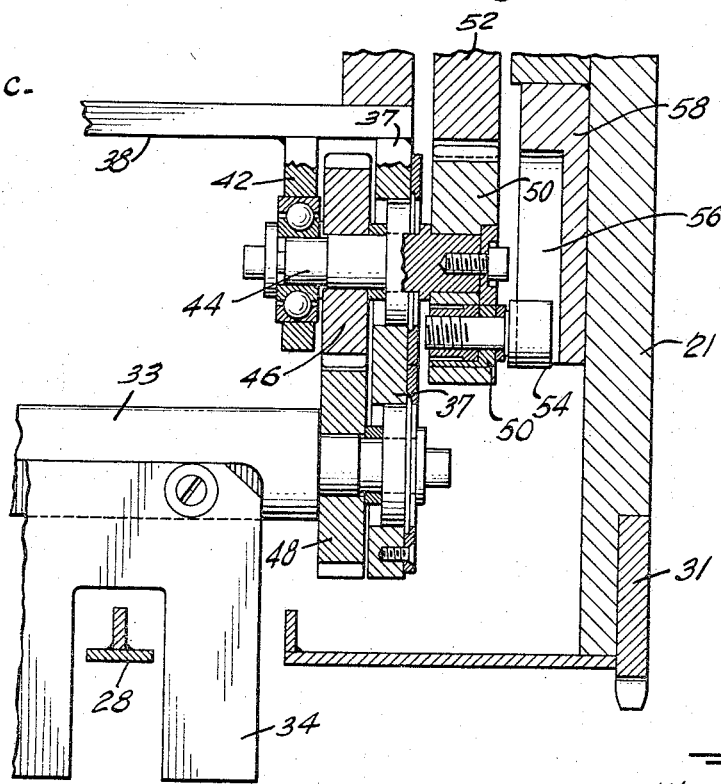
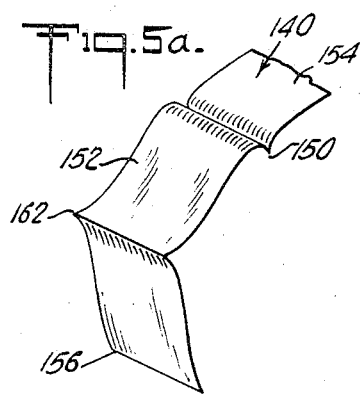
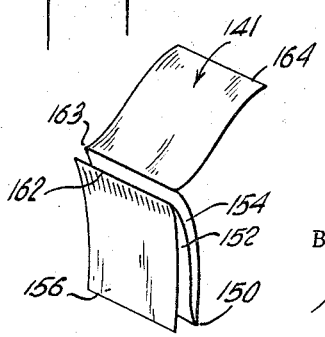
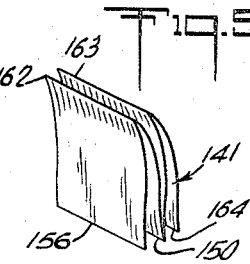
INVENTOR.
ROLAND BRADLEY BILANE
BY W. Frederick Mayer, Jr.
ATTORNEY

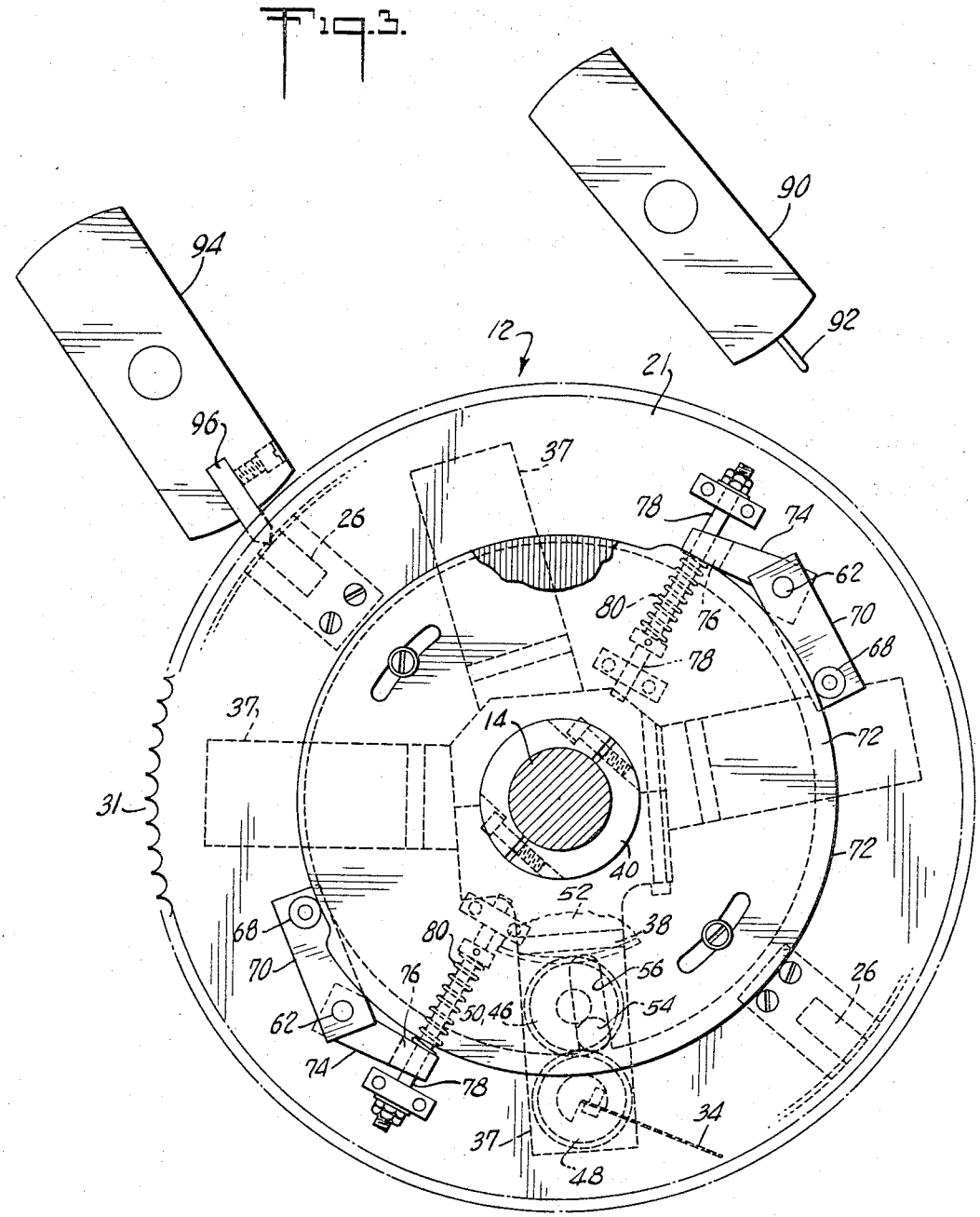

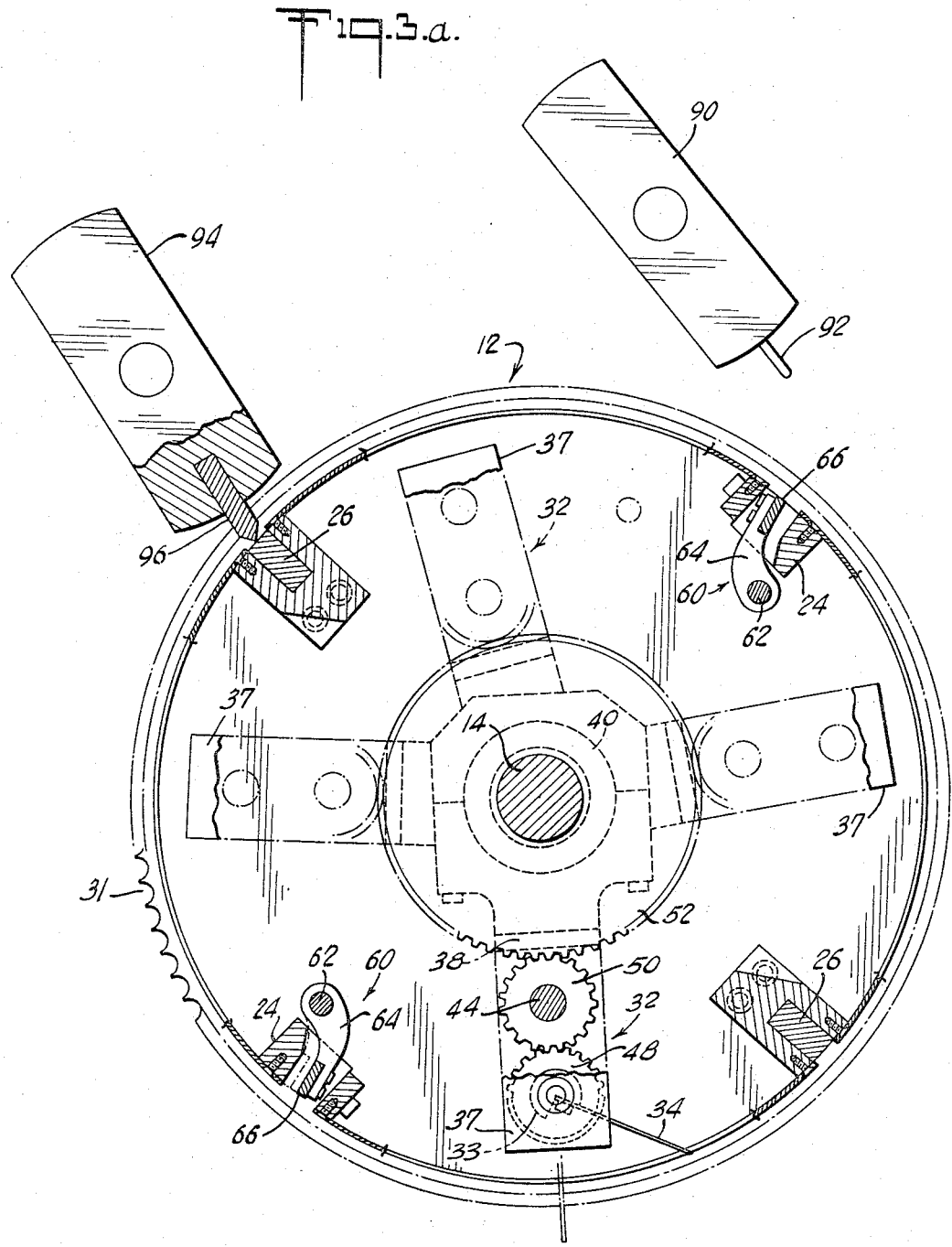

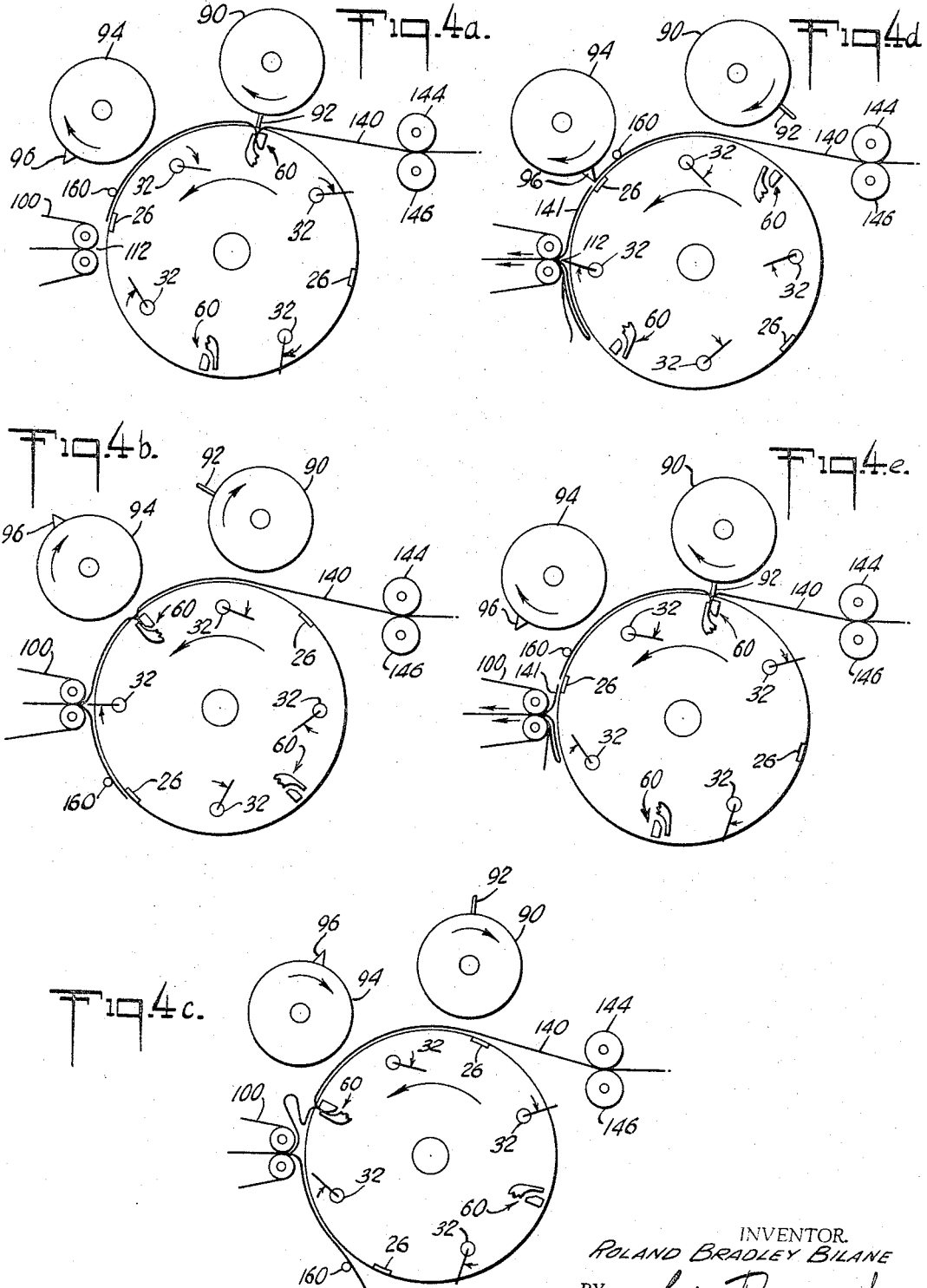

United States Patent Office 3,337,211
Patented Aug. 22, 1967

3,337,211
APPARATUS FOR CONTINUOUSLY FOLDING
AND CUTTING OFF WEB MATERIAL
Roland B. Bilane, West Keansburg, N.J., assignor to
Johnson & Johnson, a corporation of New Jersey
Filed July 23, 1965, Ser. No. 474,368
7 Claims. (Cl. 270—76)

This invention relates to folding machines and more particularly to apparatus for continuously cutting and folding flexible web material.

It is an object of the present invention to provide apparatus for forming in a web of flexible material, a series of transverse folds alternately opening in opposite directions.

It is another object of the present invention for the formation of articles from sections of a continuous strip of flexible material which articles are alternately folded transversely in opposite directions.

It is another object of the present invention to provide flexible strip folding apparatus which assures precise and positive engagement of the strip material along the transverse fold lines being formed therein.

The invention comprises generally, in combination, a first carrier movable to convey a section of flexible strip material longitudinally, a second discharge carrier presenting a plurality of elements defining a nip into which the strip material is adapted to be tucked along crease lines transverse to the direction of strip movement, clamping means on the first carrier, means for affecting a clamping engagement by said clamping means on the strip along a crease line transverse to the direction of strip movement and in a position dividing the strip section into portions forward and rearward of said crease, means mounted on the first carrier for tucking the forward and rearward portions of the strip sections at given positions there along into the nip of the second carrier along crease lines closely adjacent and means for actuating the second carrier to draw the folded strip section away from the first carrier after release of the strips by the clamping means thereon, the crease in the strip dividing the forward and rearward strip portions at the apex of a fold opening in one direction and the creases in the forward and rearward strip sections being at the apices of folds opening in the opposite direction.

These and other objects, features and advantages of the present invention will be in part obvious and in part specifically referred to in the description hereinafter contained which, when taken in conjunction with the accompanying drawings, discloses a preferred form of apparatus constructed to operate in accordance with the invention. The disclosure, however, should be considered merely as illustrative of the principles of the invention in its broadest aspects.

In the drawings:

FIGURE 1 is a fragmentary over-all schematic representation of folding mechanism embodying the invention.

FIGURE 1a is an enlarged fragmentary view of a driving train for the take-off apparatus in the folding mechanism of FIGURE 1 with the endless belts removed for clarity.

FIGURE 2b is a fragmentary plan view, the cut-off anvil positioned on the periphery of the rotary folding turret illustrated in FIGURE 2.

FIGURE 2c is an enlarged fragmentary cross-sectional view through the drive train of the tucking blade assembly shown in elevation at the bottom of FIGURE 2.

FIGURE 3 is a sectional view shown partly in elevation of the rotary folding turret taken approximately along lines 3—3 of FIGURE 2 with certain of the inner parts shown in phantom lines.

FIGURE 3a is a sectional view of the rotary folding turret taken approximately along lines 3a—3a of FIGURE 2.

FIGURES 4a through 4e are a series of schematic side elevational views illustrating the apparatus of the present invention in operation.

FIGURES 5a through 5c are a series of perspective views showing a section of flexible web material as it is folded and creased by the apparatus of the present invention.

Figure 2A:
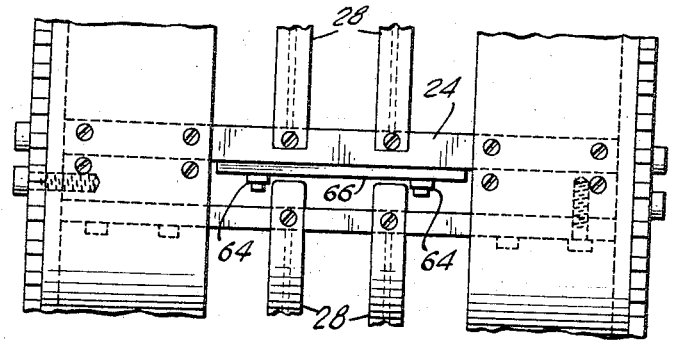
FIGURE 2a is a fragmentary plan view of the clamping mechanism shown in elevation at the top of FIGURE 2.

Referring now to the drawings there is shown a rotary folding mechanism designated generally by the numeral 10 embodying the present invention for forming transverse folds in a continuous strip of flexible material alternately opening in opposite directions.

The folding mechanism 10 comprises a first carrier means in the form of a turret 12 adapted to rotate about stationary shaft 14 suitably secured against rotation adjacent each end in frame members 16. End plate members 20 and 21 of rotatable turret 12 longitudinally spaced along shaft 14 are mounted for rotation thereabout on bearings 22. End plates 20 and 21 are joined together for rotation in unison by a pair of anvils 24 and a pair of fixed clamping bars 26 extending therebetween and positioned about the periphery of the turret 180° apart respectively. Extending circumferentially between and joining together the spaced anvils and fixed clamping bars are arcuately shaped guide rails 28 forming an open framework peripheral surface for the turret 12. Sprocket rings 30, 31 are secured to the circumferential edge of end plates 20 and 21 respectively by which turret 12 is driven for rotation about shaft 14 by a chain drive described more fully hereafter.

There is provided within the turret 12, four web tucking elements 32 each comprising a tucking blade shaft 33 having a tucking blade 34 extending radially therefrom, which shaft 33 is suitably journaled for rotation adjacent each end at the distal ends of a pair of radially parallel arms 36, 37 extending from a base member 38 rotatable about the turret shaft 14 on a pair of spaced bearings 40. From the base member 38, between the two radially extending arms 36, is a stub arm 42 radially parallel thereto and which supports the inner end of a gear shaft 44 rotatably journaled therein. The gear shaft 44 extends through radial arm 37 nearest end plate 21 of the turret 12. Secured to the gear shaft 44 between stub arm 42 and radial arm 37 is a first spur gear 46 which meshes with a spur gear 48 secured at the end of the tucking blade shaft 33 adjacent the inner side of radial arm 37. At the outer end of the gear shaft 44 is secured a second spur gear 50 which meshes with a stationary ring gear 52 secured to the turret shaft 14. This second spur gear 50 has mounted thereon an eccentric cam follower 54 insertable in a radially extending cam slot 56 formed in a cam plate 58 adjustably secured to and rotatable with end plate 21 of the turret 12.

At each of the locations of the fixed clamping bars 24 mentioned earlier is a movable clamping mechanism 60 consisting of a clamping shaft 62 extending through each end plate 20, 21 suitably journaled for rotation therein. Fixed by radially extending arms 64 on the clamping shaft 62 between the end plates 20, 21 of the turret 12, is a clamping bar 66 which is movable through an arc by partial rotation of the clamping shaft 62. Such rotation of the clamping shaft 62 causes the movable clamping bar 66 to move away from or towards the stationary clamping bar 24 fixed adjacent each end in end plates 20, 21 of the turret 12. Predetermined opening and closing of the clamping mechanism 60 is accomplished by a cam follower 68 attached at one end of a radially extending lever arm 70 secured to the end of the clamping shaft 62 that passes through end plate 21 of the turret 12. During rotation of the turret 12, the cam follower 68 rides on a cam plate 72 adjustably secured to the turret shaft 14.

To control the clamping pressure exerted by the movable clamping bar 66 against the fixed clamping bar 24, a radially extending, forked arm 74 is fixed to one end of the clamping shaft 62. Fitting within the slot 76 formed in the end of the forked arm 74 is a rod 78 secured to and extending radially on the outer face of end plate 21. A helical spring 80 surrounds the radially extending rod 78 and the inner end of the spring 80 abuts against a collar 82 adjustably secured near the inner end of the rod 78. The outer end of the spring 80 abuts against the forked arm 74 and the adjustable collar 82 is secured to the rod 78 at a position where the spring 80 is under sufficient compression to effect the desired biasing force of the movable clamping bar 66 against the fixed clamping bar 24.

Positioned externally of the turret 12 and mounted for rotation in the frame 16 is an external tucking blade roll 90 having a tucking blade 92 positioned longitudinally along the surface of the roll 90. Rotation of tucking blade roll 90 is so timed to engage cooperatively the above-described clamping mechanisms 60 positioned on the turret 12 during rotation of the latter.

A cut-off knife roll 94 having a sharp blade 96 fastened longitudinally along the surface thereof is similarly positioned externally of the rotatable turret 12. Similarly, the cut-off knife roll 94 is driven for rotation such that the sharp blade 96 is timed to meet the earlier-mentioned anvils 26 secured at the periphery of the rotating turret 12.

Adjacent to the above-described rotatable turret 12 is a second carrier means 100 in the form of a belt conveyor 102, 104. This second carrier 100 provides a take-off device for removing from the surface of the rotatable turret 12 sections of the folded and creased web material positioned in the take-off device 100 by the internal tucking elements 32.

The externally positioned take-off device 100 is comprised of a series of upper 102 and lower 104 endless belts positioned around parallel, spaced, roller shafts 106. The end of the take-off device 100 positioned in close proximity to the periphery of the turret 12 contains an upper belt pull roller shaft 108 and a lower belt pull roller shaft 110 defining a nip 112 between the upper series of belts 102 and the lower series of belts 104 into which the transversely creased, folded and severed web sections are fed from the turret member 12. The upper pull roll 108 of the take-off device 100 or alternately the lower pull roll 110 or both are biased towards each other with adjustable spring members 114.

Both series of endless belts, upper 102 and lower 104, are driven through vertically spaced gears 116, 118 fixed on the ends of the belt pull roll shafts 108, 110 respectively. The gears 116, 118 at the ends of upper 108 and lower 110 pull roll shafts are connected to be driven in unison through an idler gear train consisting of a pair of meshing spur gears 120, 122 mounted vertically on an arm 124 pivotally connected to a base member 126. The upper 120 and lower 122 idler gears are then biased into meshing engagement with the upper 116 and lower 118 pull roll gears respectively by a spring member 128 urging the idler gear pivot arm 124 towards the pull rolls 108, 110. Such biasing of the idler gear arm 124 provides an engaging driving train even while the upper and lower pull rolls 108, 110 move away from each other against their spring biasing force 114 as continuous creases of the web section being folded on the turret 12 are fed into the nip 112 defined between the upper and lower pull rolls 108, 110.

The primary driving train for cooperative movement of the above-described apparatus and elements consists of a pair of chains 130 (only one shown) driven by a motor 131 and mounted over a series of spaced, shaft-mounted sprockets 132. A portion of the driving chains 130 engages a sector of each of the ring sprockets 30, 31 fixed to the peripheral edges of the end plates 20, 21 of the turret 12. In the view of the apparatus 10, schematically illustrated in FIGURE 1, the chains 130 are driven at a constant velocity in a clockwise direction causing counterclockwise rotation of the turret 12 about its shaft 14.

Also driven by the same primary driving motor 131 by any suitable driving train (not shown) are the cut-off knife roll 94 and the web tucking roll 90 mounted externally of the rotating turret 12 and timed for cooperative engagement with the anvils 26 and clamping mechanisms 60 of the turret 12 respectively. The take-off apparatus 100 is driven through a chain drive 135 coupled via a magnetic clutch 136 of the type which is engageable on a timed schedule or for a predetermined number of revolutions. This intermittently engaged clutch 136 provides for discontinuous driving of the take-off mechanism 100 permitting positive engagement between the conveyor belts 102, 104 thereof and the folded portions of the web material inserted therein as described more fully hereafter.

Figure 2:
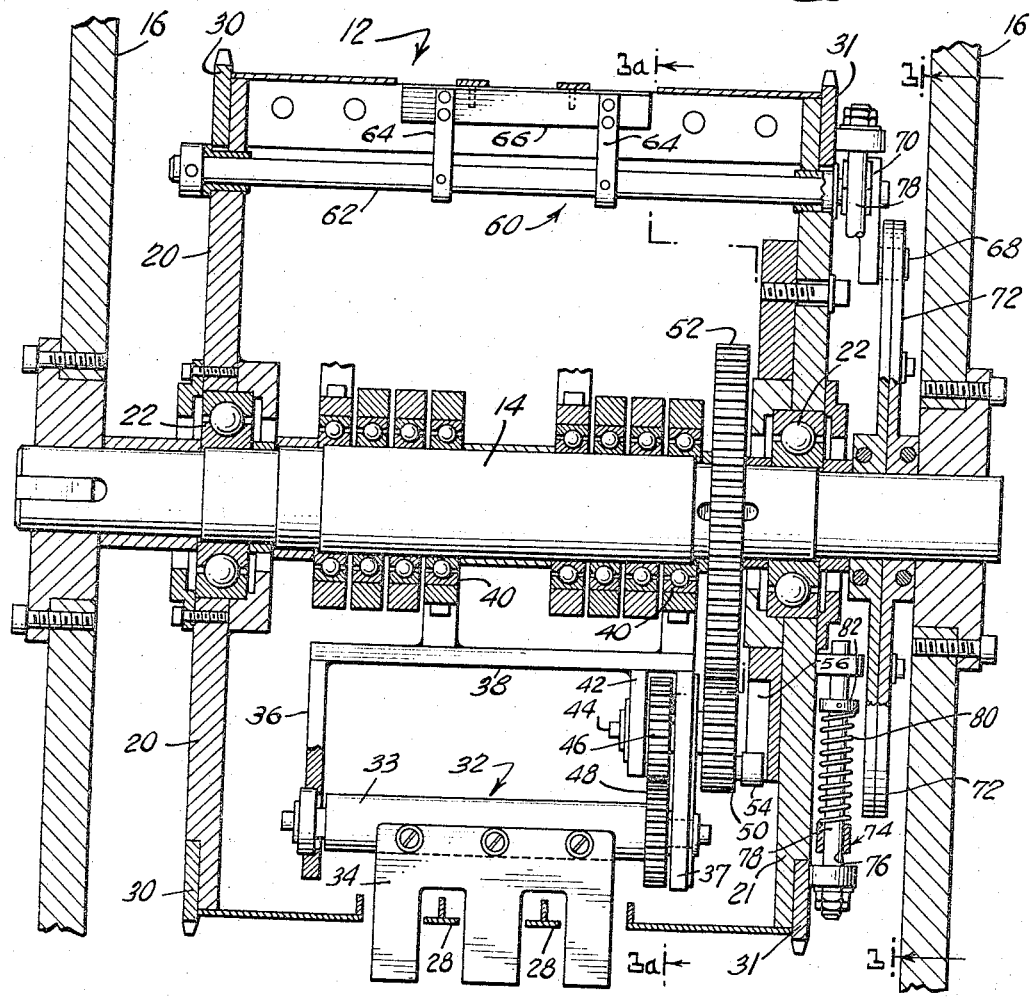
FIGURE 2 is a fragmentary cross-sectional view of the rotary folding turret taken approximately along lines 2—2 of FIGURE 1.

Referring now more particularly to FIGURES 2, 2c and 3a, the detailed motion of the tucking blade elements 32 positioned within the rotating turret 12 will be readily apparent. It is seen that as the end plates 20, 21 of the turret are rotated by the driving chains 130, the disc 58 which is secured to one of the end plates 21 and which contains the radially extending cam slots 56 rotates therewith. Tied to the cam plate 58 by the eccentrically mounted roller cam follower 54 for movement in a rotational path around the turret shaft 14 is the spur gear 50 which is meshed with the ring gear 52 fixed against rotation on the turret shaft 14. As the spur gear 50 is driven by the eccentric cam follower 54 in its rotational path, it is also rotated in a counterclockwise direction by the stationary ring gear 52 meshing therewith. Since the roller cam follower 54 is eccentrically mounted in the spur gear 50, the counterclockwise rotational velocity and the angular velocity of the spur gear 50 in its rotational path around the turret shaft 14, increase and decrease.

The tucking blade shaft 33, and thereby also the tucking blade 34 secured thereto, is tied to the cam follower spur gear 50 through meshing spur gears 46, 48 mounted for rotation on the tucking blade arm. Accordingly, the tucking blade 34 is rotated about its axis in a clockwise direction with increasing and decreasing angular velocity while at the same time, the tucking blade arms 36, 37 are rotated about the turret shaft 14 in a counterclockwise direction with increasing and decreasing angular velocity.

To assure precise and positive engagement of the web material overlying the surface of the rotating turret 12 by the tucking blades 34, each of the four tucking blade mechanisms 32 are positioned radially around the turret shaft 14 and engaged with the cam slots 56 in the end plate cam 58 such that the tucking blade 34 extends radially outward from the rotating turret 12 at precisely the point when the blade 34 passes a position closely adjacent the nip 112 defined between the upper 102 and lower 104 belts of the take-off mechanism 100. The positionings of the tucking blade arms 36, 37 at this point are selected such that their longitudinal axes are horizontal and the eccentric cam followers 54 on the cam spur gears 50 are positioned within the radially extending end plate cam slots 56 at their outermost extension. With such a cam follower engagement, the tucking blade arms 36, 37 reach their maxium decelaration for counteracting the counterclockwise velocity of the rotating turret 12. In this maner, the tucking blade elements 32 are substantially stationary with respect to the take-off apparatus 100 at precisely the moment the web material is being tucked into the nip 112 thereof.

In the embodiment of the invention described herein, a 3:1 gear ratio between the fixed ring gear 52 and the tucking blade spur gear 48 is selected so that the tucking blade 34 during its rotation extends beyond the periphery of the rotating turret 12 at three positions, one of which is the take-off station 100 mentioned above. The other two outward extensions of the tucking blade 34 occur at positions where none of the web material overlies the surface of the rotating turret 12. While such a 3:1 ratio causes the tucking blade shaft 33 to make four complete revolutions during one complete revolution of the tucking blade mechanism 32 around the turret shaft 14 because of a planetry effect, the tucking blade 34 extends beyond the periphery of the turret 12 at only three stations as a result of the turret 12 also making one complete revolution during the same period of time.

Now referring more particularly to FIGURES 1 and 4a through 4e, the general operation of the apparatus 10 of the present invention and the sequential steps performed thereby upon a continuous web of flexible material 140 are shown. The continuous web of flexible material 140 is fed to the surface of the rotating turret 12 from a supply roll 142 by a pair of opposed pull rolls 144, 146. The web 140 passes between the external tucking roll 90 and the rotating turret 12. The external tucking roll 90 is driven in timed relationship to the rotating turret 12 so that the tucking blade 92 positioned longitudinally along the external tucking roll 90 tucks a portion of the web 140 material into the clamping mechanism 60 on the turret 12. As the tucking blade 92 is withdrawn from the clamping mechanism 60 on the turret 12, the cam follower 68 on the movable clamping bar shaft 62 passes onto the low surface of the clamping mechanism cam plate 72 causing the movable clamping bar 66 to move under its spring biasing force 80 against the fixed clamping bar 24 with the web material 140 entrapped therebetween. This forms an internal crease 150 in the flexible web material 140 dividing the same into forward 152 and rearward portions 154.

At approximately the same time the internal crease 150 is being formed in the web material, the blade 96 on the external knife roll 94 coacts with the anvil 26 positioned on the periphery of the rotating turret 12 to sever the web 140 ahead of the internal crease 150 forming the leading end 156 of the section of web material 140 being described in this sequence of operation. As the web material 140 is severed, a clamping bar 160 secured at each end to the pair of driving chains 130 driving the rotating turret 12 overlies the leading edge 156 of the web section 140 holding it against the turret guide rails 28.

Continued counterclockwise rotation of the turret 12 from the position shown in FIGURE 4a to the position shown in FIGURE 4b positions the forward portion 152 of the web section 140 adjacent the nip 112 of the take-off mechanism 100 and the internal tucking blade 34 rotates to extend beyond the periphery of the turret 12 thereby thrusting the web 140 into the nip 112 defined between the discharge belts 102, 104. The drive chain 135 for driving the take-off apparatus 100 is inoperative at this time by virtue of the magnetic clutch 136 interposed in the drive train 135 being disengaged. Being stationary, the belts 102, 104 of the take-off apparatus 100 positively engage the fold 162 in the web material 140 as it is placed in the nip 112 between the upper and lower pull rolls 108, 110 by the turret tucking blade 34.

FIGURE 4c shows that the fold 162 in the web material 140 continues to be held firmly within the nip 112 of the take-off apparatus 100 while the oppositely directed crease 150 in the web material 140 continues to be clamped firmly within the clamping mechanism 60 on the rotating turret 12 as it rotates past the external take-off apparatus 100. Such continued rotation of the turret 12 by the driving chains 130 also lifts the hold-down bar 160 secured to the driving chains 130 off the leading end 156 of the web section 140.

As the turret 12 continues counterclockwise rotation from the position shown in FIGURE 4c to the position shown in FIGURE 4d, the transverse crease 150 which has been formed by the rotating turret 12, and which has been held therein during the course of its travel from the positions of FIGURE 4a through FIGURE 4c by the clamping mechanism 60 is released from the turret 12. When the clamping mechanism 60 holding the web 140 in the turret 12 reaches a station beyond the external take-off apparatus 100 a distance equal to the length of the portion of the web 140 existent between the fold 162 held in the take-off apparatus 100 and the crease 150 held in the turret 12, the cam follower 68 on the shaft 62 of the clamping mechanism 60 rides up to the high surface of the clamping mechanism cam plate 72. This results in the rotation of the movable clamping bar shaft 62 against its spring biasing force 80 and moves the movable clamping bar 66 away from the fixed clamping bar 24 permitting the crease 150 in the web 140 to fall free from the turret 12.

Substantially simultaneously with the release of the crease 150 held in the turret, a second fold 163 is formed in the web material 140 by a second turret tucking blade 34 which is operative to tuck the web portion 154 rearward of the released crease 150 into the nip 112 between upper 108 and lower 110 pull rolls on the external take-off device 100 which still holds the first fold 162 in the forward portion 152 of the web 140. It is further seen that the external cut-off knife roll 94 has made one complete revolution by this time and has again cooperatively engaged the second anvil 26 positioned on the turret 12 to sever the continuous web 140 and form the trailing end 164 of the web section 141 previously folded and now held solely in the take-off apparatus 100.

At this stage in the counterclockwise rotation of the turret 12, a limit switch 166 is tripped by one of the hold-down bars 160 secured to the turret driving chains 130 (FIGURE 1) which engages the magnetic clutch 136 for driving the take-off device 100.

The magnetic clutch 136 remains engaged, by a predetermined setting, for a period of time sufficient for pulling a single folded, creased and severed web section 141 through the external take-off apparatus 100, after which the magnetic clutch 136 disengages and the take-off apparatus 100 stops moving. It is then ready to receive the next section of web material 140 (FIGURE 4e) from the tucking blades 34 of the rotating turret 12 as the operations described above are repeated.

As each of the folded, creased, and severed web sections 141 are discharged from the take-off apparatus 100, they are then ready for further processing such as bundling, packaging, etc.

For clarity, FIGURES 5a through 5c show the folded product 141 as it is formed by the above-described apparatus.

The crease 150 formed in the clamping mechanism 60 divides the strip material 140 into forward 152 and rearward 154 sections. Then the tucking blade 34 of the turret 12 forms a first fold 162, which is oppositely directed from the dividing crease 150, in the forward section 152 which fold 162 is held in the nip 112 of the take-off apparatus 100.

At FIGURE 5b, the strip dividing crease 150 is released from the turret 12, and a second fold 163, which is formed in the same direction as the first fold 162 in the forward section 152 and oppositely directed from the dividing crease 150, is tucked into the nip 112 of the take-off apparatus 100 by the tucking blade 34 on the turret 12. This is also the time when the web 140 is severed and defines the trailing edge 164 of the folded web section 141.

The folded web section 141 as shown in FIGURE 5c has assumed a W-folded configuration and is ready to be pulled through the take-off apparatus 100 for discharge therefrom.

From the operative steps illustrated in FIGURES 4a through 4e and from the formation of the web section 141 into folded products as shown in FIGURES 5a through 5c, it is apparent that two individual web material products are creased and folded into a W-configuration for each single rotation of the rotating turret 12. It is to be understood, however, that varying the number of blade tucking elements 32, internal clamping mechanisms 60 and cut-off anvils 26 and their relative positions around the peripheral surface of the turret 12, will produce folded and creased web sections 141 of varying lengths and having a varying number of alternately opening transverse folds. Similarly, varying the positions of the blade-tucking elements 32 adapted to tuck the web section 141 into the external take-off apparatus 100 with respect to the locations of the cut-off anvils 26 and the clamping mechanisms 60 results in producing portions of web material 141 of varying lengths intermediate the alternate folds formed therein, i.e., web portions of equal or of unequal lengths.

While I have described my invention with particular reference to what is believed to be the preferred embodiment, it is to be expressly understood that the principles of the invention described therewith are equally adaptable to other embodiments contemplated within the scope of the present invention and that various changes, alterations, modifications or variations can be made therein while remaining within the spirit and scope of the invention as defined in the following appended claims.

I claim:

1. A machine for transversely creasing a strip of material to form a series of folds alternately opening in opposite directions which comprises, in combination:
   (a) a first carrier movable to convey a section of strip material longitudinally,
   (b) a second carrier having a plurality of elements defining a nip into which said strip material is adapted to be tucked along fold lines transverse to the direction of strip movement,
   (c) clamping means on said first carrier,
   (d) means for effecting a clamping engagement by said clamping means on the strip along a crease line transverse to the direction of strip movement and at a position dividing the strip section into portions forward and rearward of said crease,
   (e) means mounted on said first carrier for tucking said forward and the rearward portions of said strip section at given positions there along into said nip of said second carrier along said fold lines transverse to the direction of said strip movement, and
   (f) means for actuating said second carrier to draw said folded and creased strip section away from said first carrier after release of said strip section by the clamping means thereon, said crease dividing said strip section into forward and rearward strip portions having an apex in one direction and said folds in the forward and rearward strip portions having apices in the opposite direction.

2. A combination according to claim 1 wherein said first carrier is a turret rotatable about an axis and said clamping means are positioned at the periphery of said turret.

3. A combination according to claim 2 wherein said means for effecting the clamping engagement includes a roll having an axis exterior to the periphery of said first carrier and having a tucking device timed to tuck said strip into said clamping means during the rotation of said first carrier.

4. A combination according to claim 2 wherein a strip cutting device is operable in timed relationship with the rotation of said first carrier to sever said strip and to define the terminal end of a folded and creased strip section about to be discharged through said second carrier and the leading end of a strip section about to be folded on said first carrier.

5. A combination according to claim 4 wherein a clamp is rendered operable to hold a section of said strip to be folded to said first carrier at the leading end thereof, and is rendered inoperable to hold said end as said forward portion of said strip material is tucked into the nip of said second carrier.

6. A combination according to claim 4, wherein said clamping means on said first carrier is rendered inoperable to hold said strip section as said rearward portion thereof is tucked into the nip of said second carrier.

7. A machine for transversely creasing a strip of flexible material to form a series of folds alternately opening in opposite directions which comprises, in combination:
   (a) a first carrier rotatable in one direction about an axis for conveying said strip material longitudinally over the peripheral surface thereof,
   (b) a second carrier having a plurality of rotatable elements defining a nip into which said strip material is adapted to be tucked along fold lines transverse to the direction of said strip movement,
   (c) clamping means positioned at said peripheral surface of said rotatable first carrier adapted to receive and hold said strip material along a crease line transverse to the direction of said strip movement and at a position dividing said strip material into portions forward and rearward of said crease.
   (d) a first rotatable tucking means having an axis exterior to the periphery of said rotatable first carrier timed for tucking said strip material into said clamping means along said crease line during the rotation of said first carrier,
   (e) a second tucking means mounted in said first carrier for tucking said forward and rearward portions of said material at given positions therealong into said nip of said second carrier along fold lines transverse to the direction of said strip movement,
      (1) said second tucking means being rotatable with increasing and decreasing angular velocity about the axis of said first carrier in the same direction of rotation as said first carrier, and including a tucking element thereon adjacent the inner periphery of said first carrier rotatable about an axis with increasing and decreasing angular velocity and in a direction of rotation opposite to the rotational direction of said first carrier,
   (f) cut-off means operable in timed relationship with the rotation of said first carrier to sever said strip and to define the terminal end of a first section of strip material held in said second carrier and the leading end of a second section of strip material to be folded and creased on said first carrier,
   (g) holding means operable to press said leading end of said second section of strip material against said peripheral surface of said first carrier,
      (1) said holding means being rendered inoperable to hold said leading end of said second section against the peripheral surface of said first carrier as said forward portion of said strip material is tucked into the nip of said second carrier,
   (h) releasing means operable to release said strip material from said clamping means on said first carrier as said rearward portion of said strip material is tucked into the nip of said second carrier,
   (i) means for maintaining said plurality of rotatable elements of said second carrier nonrotating as said forward and rearward strip portions are tucked into said nip therebetween, and (j) means for rotating said plurality of rotatable elements of said second carrier to draw said folded and creased strip section away from said first carrier after release of said strip section by said clamping means thereon, said crease dividing said strip section into forward and rearward portions having an apex in one direction and said folds in said forward and rearward portions having apices in the opposite direction.

References Cited

UNITED STATES PATENTS

| | | | |
|---|---|---|---|
| 340,080 | 4/1886 | Appel | 270—73 |
| 671,993 | 4/1901 | Firm | 270—76 |
| 1,752,426 | 4/1930 | Evensen | 270—76 |
| 2,336,051 | 12/1943 | Young | 270—73 |

EUGENE R. CAPOZIO, *Primary Examiner.*

P. V. WILLIAMS, *Assistant Examiner.*